(12) United States Patent
Halford et al.

(10) Patent No.: US 6,754,511 B1
(45) Date of Patent: Jun. 22, 2004

(54) LINEAR SIGNAL SEPARATION USING POLARIZATION DIVERSITY

(75) Inventors: Steven D. Halford, Palm Bay, FL (US); Mark A. Webster, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/498,961

(22) Filed: Feb. 4, 2000

(51) Int. Cl.[7] ............................. H04B 1/38; H04B 7/00; H04B 1/10; H04B 1/69; H04M 1/00

(52) U.S. Cl. ................. 455/562.1; 455/561; 455/278.1; 455/296; 375/144; 375/148

(58) Field of Search ............................... 455/561, 562, 455/422, 423, 424, 463, 464, 500, 501, 504, 506, 517, 132, 277.1, 277.2, 278.1, 279.1, 283, 284, 296, 562.1; 343/756, 909, 910; 375/144, 147, 148

(56) References Cited

U.S. PATENT DOCUMENTS

| | | | | |
|---|---|---|---|---|
| 3,733,607 A | * | 5/1973 | Bobrow et al. | 343/756.5 |
| 4,112,370 A | * | 9/1978 | Monsen | 325/40 |
| 4,723,321 A | * | 2/1988 | Saleh | 455/295 |
| 5,124,711 A | * | 6/1992 | Sorais et al. | 342/361 |
| 5,373,300 A | | 12/1994 | Jenness et al. | 343/102 |
| 5,499,033 A | | 3/1996 | Smith | 343/700 |
| 5,563,610 A | | 10/1996 | Reudink | 342/375 |
| 5,648,968 A | | 7/1997 | Reudink | 370/335 |
| 5,691,727 A | | 11/1997 | Cyzs | 342/361 |
| 5,724,666 A | * | 3/1998 | Dent | 455/562 |
| 6,064,689 A | * | 5/2000 | Vollmer et al. | 375/149 |
| 6,167,286 A | * | 12/2000 | Ward et al. | 455/562 |
| 6,314,147 B1 | * | 11/2001 | Liang et al. | 375/346 |
| 6,351,237 B1 | * | 2/2002 | Martek et al. | 342/361 |
| 6,470,192 B1 | * | 10/2002 | Karlsson et al. | 455/561 |

FOREIGN PATENT DOCUMENTS

| | | | |
|---|---|---|---|
| EP | 0 942 540 | 9/1999 | ........... H04B/1/707 |
| EP | 0 942 540 A2 | 9/1999 | ........... H04B/1/707 |
| EP | 0 961 416 | 12/1999 | ........... H04B/7/005 |
| EP | 0 961 416 A1 | 12/1999 | ........... H04B/7/005 |
| WO | WO 97/40588 | 4/1997 | ............ H04B/7/08 |
| WO | WO 97/40588 | 10/1997 | ............ H04B/7/08 |
| WO | WO 99/44308 | 12/1998 | ............ H04B/7/08 |
| WO | WO 99/44308 | 9/1999 | ............ H04B/7/08 |

* cited by examiner

*Primary Examiner*—William Trost
*Assistant Examiner*—Meless Zewdu
(74) *Attorney, Agent, or Firm*—Allen, Dyer, Doppelt, Milbrath & Gilchrist, P.A.

(57) ABSTRACT

A signal separator overcomes co-linear interference encountered in a wireless communication system base station by exploiting generally flat fading multipath characteristics of incoming signals. For this purpose, the invention employs diversity gained through the use of antenna array elements having different polarizations. An RF downconverter provides a signal separator with baseband, discrete-time digital samples of signal waveforms, received at one or more pairs of diverse polarization antenna elements. The signal separator weights and combines the baseband signals from the vertically and horizontally polarized received signals produced by the RF downconverter to estimate which signals emanate from which users. The signal separator uses polarization coefficients supplied by a coefficient calculator. To generate the polarization coefficients, the coefficient calculator is coupled to receive a set of channel fading coefficients from a channel estimator. Estimates of the channel fading coefficients may be derived using standard signal processing algorithms using the peak values and the known cross-correlation between training patterns. The coefficient calculator computes the polarization coefficients required by the signal separator by means of a coefficient matrix such that the output of the signal separator is equal to the user's information signal.

14 Claims, 5 Drawing Sheets

LINEAR SIGNAL SEPARATION USING POLARIZATION DIVERSITY

FIELD OF THE INVENTION

The present invention relates in general to communication systems, and is particularly directed to a new and improved polarization diversity-based signal processing mechanism for separating signals transmitted from multiple sources in a substantially flat fading environment and received at generally co-located diversely polarized antennas of a wireless communication base station.

BACKGROUND OF THE INVENTION

The continuing growth of wireless communication services has generated a demand for signal usage and processing techniques that can increase the capacity of the limited cellular spectrum. In many systems, spectrum availability has reached the saturation point, so that it is not possible to acquire more frequencies; as a result, to accommodate future growth, existing frequencies must be shared among more users. This, in turn, implies the need for more sophisticated signal processing schemes to separate the signals at the receiver (e.g., base station).

A variety of interference avoidance schemes are currently used for separating users sharing the same frequency. Some methods, such as time division and code division techniques, require coordination and cooperation among users. However, not all methods require user cooperation; some rely on enhanced signal processing at the receiver. For example, advanced or 'smart' signal separation techniques that use an array of antenna elements are able to increase user capacity, by controllably shaping the array's radiation pattern to separate users transmitting from different angular locations.

Figure 1:
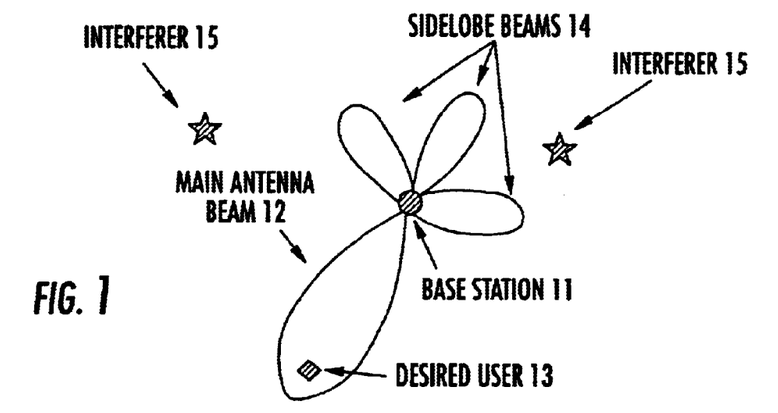
FIG. 1 is a reduced complexity diagram of a wireless antenna system, showing the beam-forming functionality of a base station antenna array to increase the antenna gain of a main beam toward a desired user, while decreasing the gain of sidelobe beams toward interferers.

As illustrated in the reduced complexity wireless system diagram of FIG. 1, these systems employ the beam-forming ability of antenna arrays at a base station 11 to increase the antenna gain of a main antenna beam 12 in the direction of the desired user 13, while at the same time selectively decreasing the antenna gain of sidelobe beams 14 in the direction of interfering signals 15. For most applications, enhancing the desired signal of interest and suppressing the interference makes smart antennas highly effective in enabling more users to share the same frequency or channel.

Figure 2:
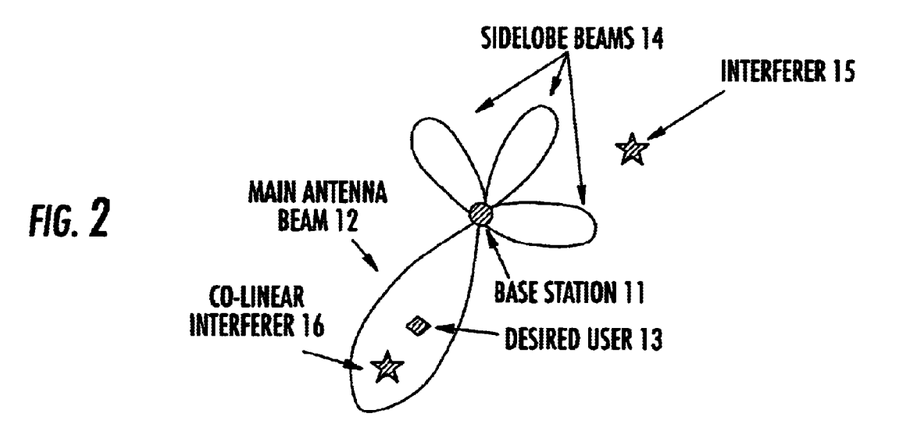
FIG. 2 shows the wireless antenna system diagram of FIG. 1, wherein a desired signal and one or more interfering signals arrive along generally co-linear directions.

However, because they rely on directional information, such beam-forming antennas cannot separate multiple signals (as in the case of high user density), in which the desired signal and one or more interfering signals originate from essentially the same (or generally co-linear) direction or angle of arrival, as shown diagrammatically at 13 and 16, respectively in FIG. 2. To prevent such co-linear interference, it is necessary to employ complicated spectrum management schemes, which may render the resulting antenna system prohibitively expensive.

One proposed enhancement to beam-forming schemes is to have the base station receiver rely on multipath differences between each user. This method has the advantage that it can be used with other methods and does not require cooperation among users. Rather than rely on transmission differences (e.g., time, angle, code) between users, the multipath processing approach relies on the different propagation environment seen by each user. A fundamental drawback to this approach is the fact that it is based on non-linear minimization, and is very complex to implement.

For many cellular installations, the base station is located on a tower, so that multipath arrival is due principally to reflections from objects that are very near to the mobile transmitter. Since these reflections impart nearly the same path delay, the multipath delay spread among plural arriving signals may be less than a sample interval. When this occurs, the multipath environment may be considered to be a substantially flat fading environment.

SUMMARY OF THE INVENTION

Pursuant to the present invention, the above-discussed substantially co-linear interference problem is successfully addressed by exploiting characteristics of the incoming signals other than their direction of arrival. In particular, the signal separation scheme of the present invention is based on multipath differences that arise in a substantially flat fading environment, when signals arrive at at least two (base station) antenna elements having diverse characteristics from the same or substantially the same direction passing through a common lobe of a radiation pattern of the base station's antenna.

In accordance with a preferred embodiment, the invention exploits diversity gained through the use of plural (e.g., a pair of) antenna array elements having different (e.g., mutually orthogonal) polarizations and also generally co-located to reduce hardware complexity. When deployed in an environment that does not impose time-dispersion (i.e., one that has substantially flat fading), the polarization diversity-based separation scheme of the invention provides an extremely simple technique for separating co-linear signals. This, in turn, enables a smart antenna system to operate without complicated spectral management techniques.

Like existing multipath processing schemes, the invention can be used in conjunction with multiple access waveforms (e.g., time-division or code-division) and can complement other signal separation methods such as beam-forming, referenced above. The signal separation method of the invention also does not require cooperation among users, but rather relies on environmental differences between each user to emphasize one user over the other at one of the respectively diverse characteristic antenna elements, and to emphasize the other user over the one at the other antenna element.

While the invention can be used with antenna elements that are spatially separated by some prescribed distance, it is primarily intended for the case of generally co-located antenna elements that are designed to receive different (relatively orthogonal, e.g., vertical and horizontal) polarizations, and thereby reduces the size of the receiver antenna. Moreover, unlike other multipath methods, the invention employs linear signal processing, which reduces the complexity required to separate two potentially interfering signals.

In a preferred, but non-limiting embodiment, the polarization diversity-based signal separation receiver architecture of the a invention comprise four signal processing units: an RF downconverter, a signal separator, a coefficient emulator, and a channel estimator. The RF downconverter provides the signal separator with baseband, discrete-time samples of signal waveforms, that are received at a plurality of one or more pairs of antenna elements, having respectively different sensitivity characteristics. As pointed out above, in a non-limiting, but preferred embodiment, the antenna elements of each pair are generally co-located and are mutually orthogonally polarized.

The signals received by orthogonally polarized antenna elements are downconverted to baseband, and then filtered in low pass filters to remove vestigial sideband images and limit the bandwidth. The filtered baseband signals are digitized and coupled to respective inputs of the signal separator, which controllably weights and combines the baseband, discrete-time sample signals of the vertically and horizontally polarized received signals to estimate which signals emanate from which users.

For this purpose, the signal separator multiplies each signal sample received by the vertically polarized, antenna by first and second vertical polarization coefficients supplied by the coefficient calculator. It also multiplies each signal sample received by 'horizontally polarized' antenna by first and second horizontal polarization coefficients supplied by the coefficient calculator. The products are summed in pairs to produce weighted and combined output signals that are output as first and second separated signals associated with respective first and second users.

In order to generate the two sets of vertical and horizontal polarization coefficients, the coefficient calculator is coupled to receive a set of channel fading coefficients from the channel estimator. Although not limited to any particular mechanism to calculate the channel fading coefficients, a non-limiting technique employs training sequences embedded in each user's transmission burst. The vertical and horizontal signal inputs are correlated with both user's (known) training sequences, to produce a set of peak values. Estimates of the channel fading coefficients may be derived by means of standard signal processing algorithms using the peak values and the known cross-correlation between training patterns. Alternatively, adaptive methods based on the received data or blind methods based on statistical properties may be employed.

The coefficient calculator computes the polarization coefficients required by the signal separator by means of a coefficient matrix such that, in the absence of noise, the output of the signal separator is equal to the user's information signal. The condition the signal separator must satisfy for perfect signal separation is a set of four linear equations having four unknowns, a solution for which is determinable, provided that the fading coefficient matrix is full rank. When a statistical description of additive noise is available, the coefficient requirements may be modified in a manner that enables the coefficient calculator minimize the mean square error in the signal estimates.

As an alternative to using a pair of mutually orthogonally polarized antenna elements, it is also possible to employ plural sets (pairs) of antennas each comprising a pair of cross-polarized elements (horizontal and vertical). The inputs from these sets of cross-polarized antenna pairs can be weighted and combined upstream of the signal separator in order to optimize the two signals applied to its input ports.

In addition, if the channel is subject to frequency selective fading due to multipath, and the signals from different users have low cross-correlation properties, the frequency selective fading may be converted into a substantially flat fading channel by coherently combining the observed multipath. This coherent combining may be readily be implemented by means of a Rake receiver for each polarization installed upstream of the signal separator.

DETAILED DESCRIPTION

Before detailing the architecture and operation of the polarization diversity-based signal separation mechanism of the present invention, it should be observed that the invention resides primarily in an arrangement of conventional communication hardware components and attendant supervisory communications microprocessor circuitry and application software therefor, that controls the operations of such components. In a practical implementation that facilitates their incorporation into the communication equipment of a wireless base station, this arrangement may be readily configured as field programmable gate array (FPGA)—implemented, or application specific integrated circuit (ASIC) chip sets. In terms of a practical hardware implementation, digital ASICs are preferred.

Consequently, the configuration of such components and the manner in which they are interfaced with communication equipment of a wireless communication base station have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to show the major components of the signal separation system in a convenient functional grouping, whereby the present invention may be more readily understood.

Figure 3:
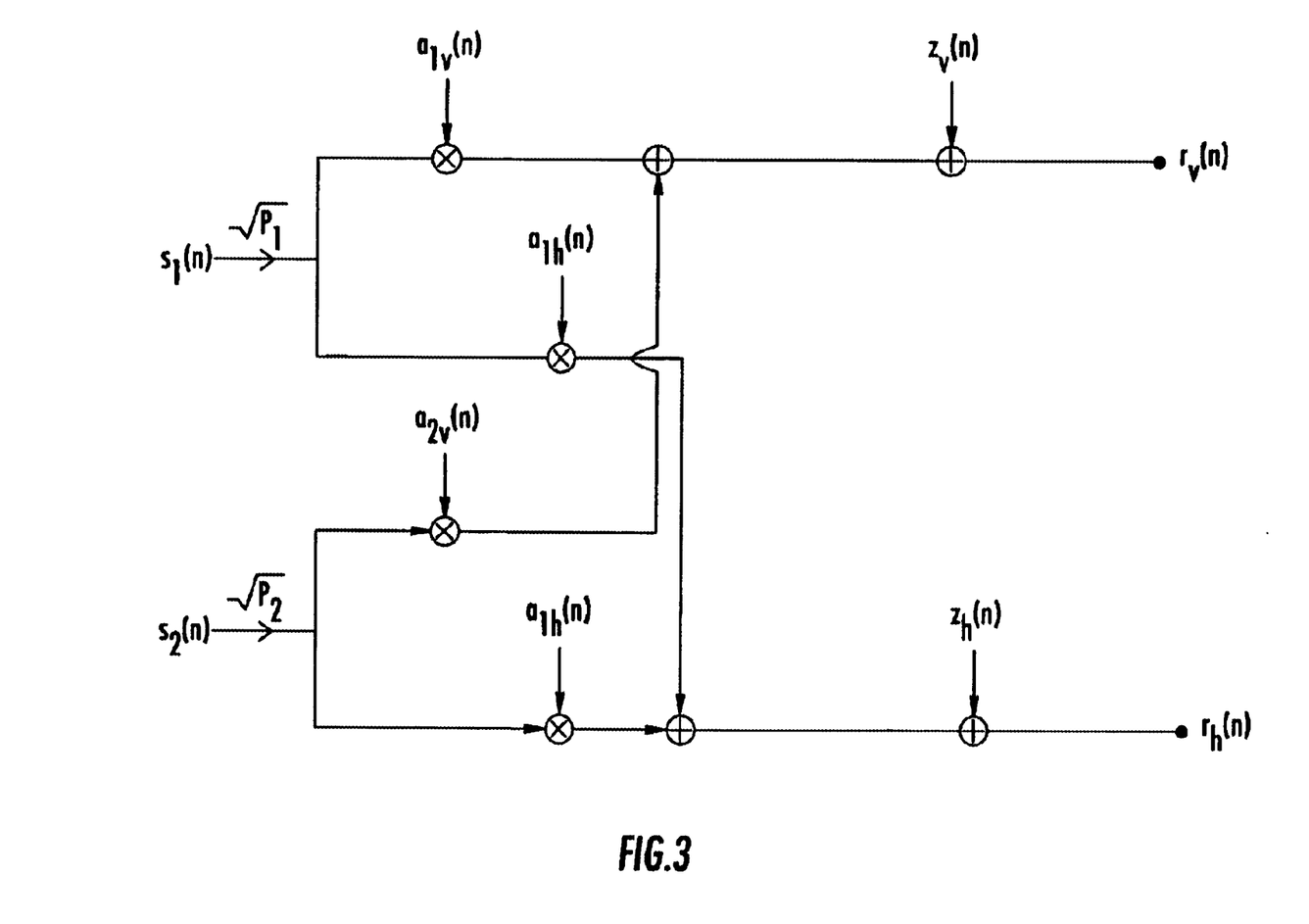
FIG. 3 diagrammatically illustrates a discrete-time model for respective vertically and horizontally polarized received signals $r_v(n)$ and $r_h(n)$.

In order to facilitate an appreciation of the functionality of the polarization diversity-based signal separation mechanism of the present invention, it is initially useful to examine the properties of the signals that impinge upon multiple antennas of the base station in the presence of flat or substantially flat fading. For this purpose, FIG. 3 diagrammatically illustrates a discrete-time model for respective vertically and horizontally polarized received signals $r_v(n)$ and $r_h(n)$, which can be described mathematically by the following equations (1) and (2):

$$r_v(n) = (P_1)^{1/2} a_{1v}(n) s_1(n) + (P_2)^{1/2} a_{2v}(n) s_2(n) + z_v(n) \qquad (1)$$

$$r_h(n) = (P_1)^{1/2} a_{1h}(n) s_1(n) + (P_2)^{1/2} a_{2h}(n) s_2(n) + z_h(n) \qquad (2)$$

wherein:

$r_v(n)$=signal received by the vertically polarized antenna;

$r_h(n)$=signal received by the horizontally polarized antenna;

$P_1$, $P^2$=power of signal transmitted from $user_1$, $user_2$;

$a_{1v}$, $a_{2v}$=fading for $user_1$, $user_2$ seen by the vertically polarized antenna;

$a_{1h}$, $a_{2h}$ = fading for $user_1$, $user_2$ seen by the horizontally polarized antenna;

$s_1(n)$, $s_2(n)$ = information signal of $user_1$, $user_2$;

$z_v(n)$, $z_h(n)$ = additive noise on the vertical, horizontal receiver.

The fading coefficients $a_{1v}$, $a_{2v}$, $a_{1h}$, $a_{2h}$ include any loss due to the orientation of the users' transmitting antennas. For example, if there is no multipath fading for $user_2$, but the antenna of this user is oriented such that half of the transmitted power is effectively projected as a vertically polarized wave and half is effectively projected as a horizontally polarized wave, then $a_{2v}(n) = a_{2h}(n) = (½)^{1/2}$.

A non-limiting embodiment of a polarization diversity-based signal separation receiver architecture in accordance with the present invention that may be readily incorporated with a wireless base station's communication equipment is diagrammatically illustrated in FIG. 4, as comprising four functional components: 1- an RF downconverter 41, 2- a signal separator 42, 3- a coefficient emulator 43 and 4- a channel estimator 44, each of which will be described individually below.

The RF downconverter 41 serves to provide the signal separator 42 with baseband, discrete-time samples of the signal waveforms, that are received at a plurality (e.g., pair) of antenna elements 51, 52, having respectively different sensitivity characteristics. In accordance with a non-limiting, but preferred embodiment, antenna elements 51, 52 are generally co-located and have respectively different polarizations (e.g., mutually orthogonal (90° differential)). For purposes of providing a non-limiting example, antenna element 51 will be referred to as a vertically (v) polarized antenna, while antennal element 52 will be referred to as a horizontally (h) polarized antenna.

The signals received by respective antenna elements 51, 52 are multiplied in respective mixers 53, 54 by the appropriate carrier frequency to translate (down-convert) the RF frequency of the received signals to baseband. These baseband signals are then filtered in low pass filters 55, 56 to remove vestigial sideband images and limit the bandwidth. The filtered baseband signals are sampled and quantized in analog-to-digital converters (ADCs) 57, 58, and the digitized signals produced thereby are coupled to respective inputs 61, 62 of the signal separator 42.

The signal separator 42 weights and combines the baseband samples of the vertically and horizontally polarized received signals to estimate which signal which signal emanates from user, and which signal emanates from $user_2$. For this purpose, as shown in the enlarged diagram of the signal separator 42 in FIG. 5, the$_1$ received 'vertical polarization' signal component $r_v(n)$ applied to its first input port 61 is coupled to a first multiplier 63, which multiplies the signal $r_v(n)$ by a first vertical polarization coefficient $g_{v1}(n)$ produced by the coefficient calculator 43, and to a second multiplier 65, which multiplies the signal $r_v(n)$ by a second vertical polarization coefficient $g_{v2}(n)$ produced by the coefficient calculator 43. Similarly, the received 'horizontal polarization' signal component $r_h(n)$ applied to the second input port 62 of the signal separator 42 is coupled to a third multiplier 64, which multiplies the signal $r_h(n)$ by a first horizontal polarization coefficient $g_{h1}(n)$ produced by coefficient calculator 43, and to a fourth multiplier 66 which multiplies the signal $r_h(n)$ by a second horizontal polarization coefficient $g_{h2}(n)$ produced by the coefficient calculator 43. The polarization coefficients $g_{v1}(n)$, $g_{v2}(n)$, $g_{h1}(n)$ and $g_{h2}(n)$ may vary with time. The products produced by multipliers 63 and 66 are summed in adder 67 and supplied as a first separated signal $ŝ_1(n)$ associated with $user_1$ at a first output port 71. The products produced by multipliers 64 and 65 are summed in adder 68 and supplied as a second separated signal $ŝ_2(n)$ associated with $user_2$ at a second output port 72.

Figure 5:
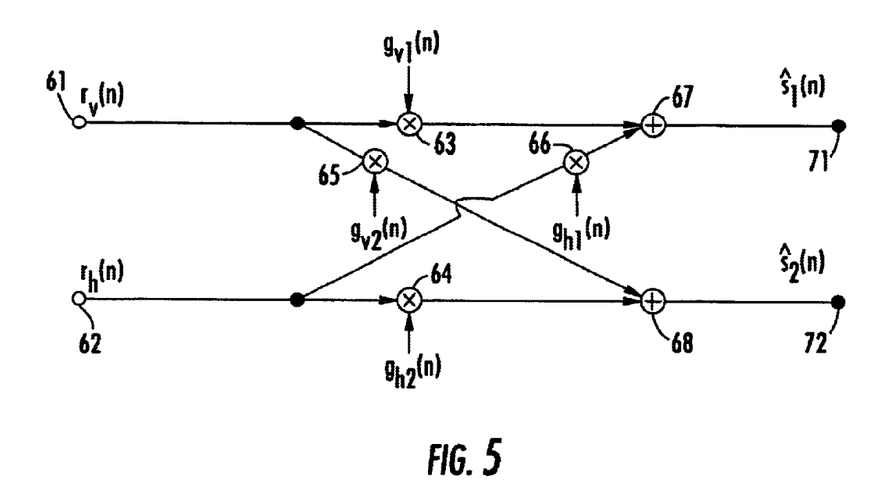
FIG. 5 is an enlarged diagram of the signal separator 42 of the receiver architecture of FIG. 4.

The estimates of $user_1$'s transmitted signal may be expressed by equation (3) as follows:

$$ŝ_1(n) = g_{v1}(n) r_v(n) + g_{h1} r_h(n) \quad (3)$$

Substitution of equations (1) and (2) into equation (3) yields the following equation (4):

$$ŝ_1(n) = g_{v1}(n)[(P_1)^{1/2} a_{1v}(n) s_1(n) + (P_2)^{1/2} a_{2v}(n) s_2(n)] + g_{h1}(n)[(P_1)^{1/2} a_{1h}(n) s_1(n) + (P_2)^{1/2} a_{2h}(n) s_2(n)] \quad (4)$$

A similar expression may be readily generated for $user_2$'s signal estimate.

In order to generate the polarization coefficients $g_{v1}(n)$, $g_{v2}(n)$, $g_{h1}(n)$ and $g_{h2}(n)$ employed by the signal separator 42, the coefficient calculator 43 is coupled to receive a set of channel fading coefficients $a_{1v}(n)$, $a_{2v}(n)$, $a_{1h}(n)$, $a_{2h}(n)$ from the channel estimator 44. (The signal processing mechanism employed by the coefficient calculator 43 to generate the polarization coefficients $g_{v1}(n)$, $g_{v2}(n)$, $g_{h1}(n)$ and $g_{h2}(n)$ from the channel fading coefficients will be described below.) While the invention is not limited to any particular mechanism to calculate the channel fading coefficients $a_{1v}(n)$, $a_{2v}(n)$, $a_{1h}(n)$, $a_{2h}(n)$, a non-limiting example is to take advantage of the embedded training sequences contained in each user's transmission burst.

As a non-limiting example, the vertical and horizontal signal inputs $r_v(n)$ and $r_h(n)$ may be correlated with both user's training sequences (which are known), to produce a set of correlation peak values. Estimates of the channel fading coefficients $a_{1v}(n)$, $a_{2v}(n)$, $a_{1h}(n)$, $a_{2h}(n)$ are readily derived using standard signal processing algorithms using the correlation peak values and the known cross-correlation between the training patterns. As an alternative scheme, adaptive methods based on the received data or blind methods based on statistical properties may be employed.

Given these channel fading estimates, the coefficient calculator 43 computes the set of four polarization coefficients $g_{v1}(n)$, $g_{v2}(n)$, $g_{h1}(n)$, $g_{h2}(n)$ required by the signal separator 42 to weight the received signals. The operation of the coefficient calculator 43 may be readily understood by writing equation (3) into matrix form as equation (5) as follows:

$$\begin{bmatrix} ŝ_1(n) \\ ŝ_2(n) \end{bmatrix} = \begin{bmatrix} g_{v1}(n) & g_{h1}(n) \\ g_{v2}(n) & g_{h2}(n) \end{bmatrix} \begin{bmatrix} r_v(n) \\ r_h(n) \end{bmatrix} + \begin{bmatrix} g_{v1}(n) & g_{h1}(n) \\ g_{v2}(n) & g_{h2}(n) \end{bmatrix} \begin{bmatrix} z_v(n) \\ z_h(n) \end{bmatrix} \quad (5)$$

$$= \begin{bmatrix} g_{v1}(n) & g_{h1}(n) \\ g_{v2}(n) & g_{h2}(n) \end{bmatrix} \begin{bmatrix} a_{v1}(n) & a_{2v}(n) \\ a_{1h}(n) & a_{2h}(n) \end{bmatrix} \begin{bmatrix} s_1(n) \\ s_2(n) \end{bmatrix} +$$

$$\begin{bmatrix} g_{v1}(n) & g_{h1}(n) \\ g_{v2}(n) & g_{h2}(n) \end{bmatrix} \begin{bmatrix} z_v(n) \\ z_h(n) \end{bmatrix}$$

From equation (5), the following matrices and vectors may be defined:

$$G(n) = \begin{bmatrix} g_{v1}(n) & g_{h1}(n) \\ g_{v1}(n) & g_{h2}(n) \end{bmatrix}$$

$$A(n) = \begin{bmatrix} a_{1v}(n) & a_{1h}(n) \\ a_{2v}(n) & a_{2h}(n) \end{bmatrix}$$

-continued $$s(n) = \begin{bmatrix} s_1(n) \\ s_2(n) \end{bmatrix}$$

$$\hat{s}(n) = \begin{bmatrix} \hat{s}_1(n) \\ \hat{s}_2(n) \end{bmatrix}$$

$$z(n) = \begin{bmatrix} z_v(n) \\ z_h(n) \end{bmatrix}$$

Using these matrix definitions, equation (5) may be rewritten in a compact form as equation (6) as follows:

$$\hat{s}(n)=G(n)A(n)s(n)+G(n)z(n) \qquad (6)$$

The coefficient calculator 43 calculates the matrix $G(n)$ such that, in the absence of noise, the outputs of the signal separator 42 are equal to the users' information signals. Mathematically, the absence of noise implies $z_v(n)=z_h(n)=0$ for all n. The output of the signal separator 43 will equal the users' information signals when the following equations (7) and (8) are satisfied:

$$\hat{s}_1=s_1(n) \qquad (7)$$

$$\hat{s}_2=s_2(n) \qquad (8)$$

This requirement is met when $G(n)$ is the matrix inverse of $A(n)$, namely $G(n)=A^{-1}(n)$ or $$G(n)A(n) = \begin{bmatrix} 1 & 0 \\ 0 & 1 \end{bmatrix} \qquad (9)$$

From Equation (9), it can be seen that the condition the signal separator 42 must satisfy for perfect signal separation is a set of four linear equations with four unknowns. Equation (9) will always have a solution provided that the fading coefficient matrix $A(N)$ is full rank. In other words, the coefficient calculator 43 uses the values obtained from the channel estimator 44 to form the matrix $A(n)$ and then solves the linear equation (9).

Figure 4:
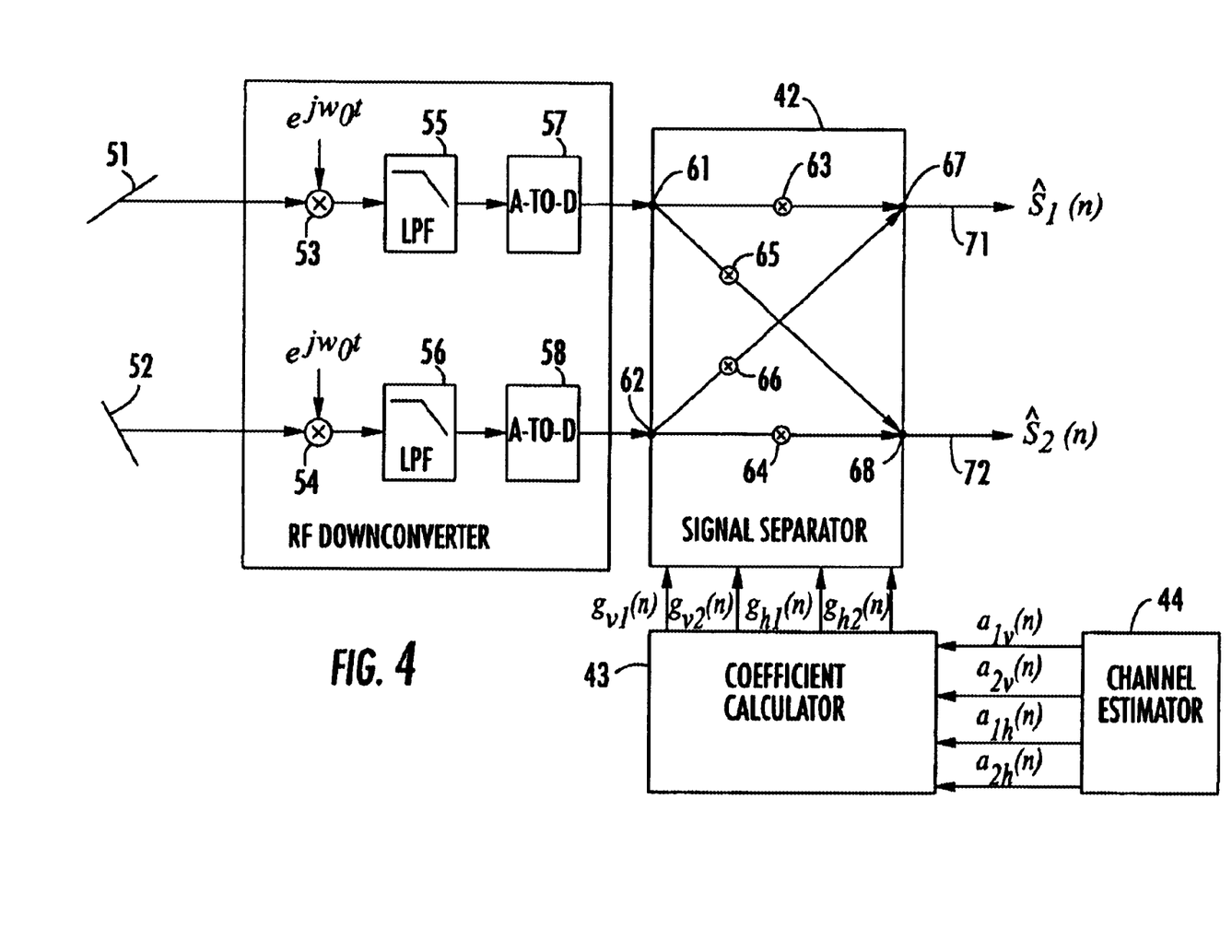
FIG. 4 diagrammatically illustrates a non-limiting embodiment of a polarization based signal separation receiver architecture in accordance with the present invention.

In addition to the above-described non-limiting example of the invention shown in FIGS. 4 and 5, there are other implementations and variations of the signal separator system that may be employed. For example, in place of the digitally implemented baseband architecture of FIG. 4, the four multipliers 63, 64, 65, 66 and two adders 67, 68 may be implemented using RF multipliers (phase shift and gain control elements) and RF adders (combiners). Such an architecture obviates the need for the analog-to-digital converters and can also eliminate the need for a frequency conversion to baseband and subsequent filtering depending on the hardware and the signals being processed.

As described above, the coefficient calculator 43 may be configured to calculate the matrix $G(n)$ in the absence of noise. When a statistical description of additive noise is available, the coefficient requirements embodied in equation (9) may be modified so that the coefficient calculator minimizes the mean square error between $\hat{s}(n)$ and $s(n)$. Namely, the coefficient calculator 43 is operative to calculate $G(n)$ such that $E\{|\hat{s}(n)-s(n)|^2\}$ is minimized, and takes noise into account. The solution for $G(n)$ is the standard minimum mean square error and is straightforward.

Figure 6:
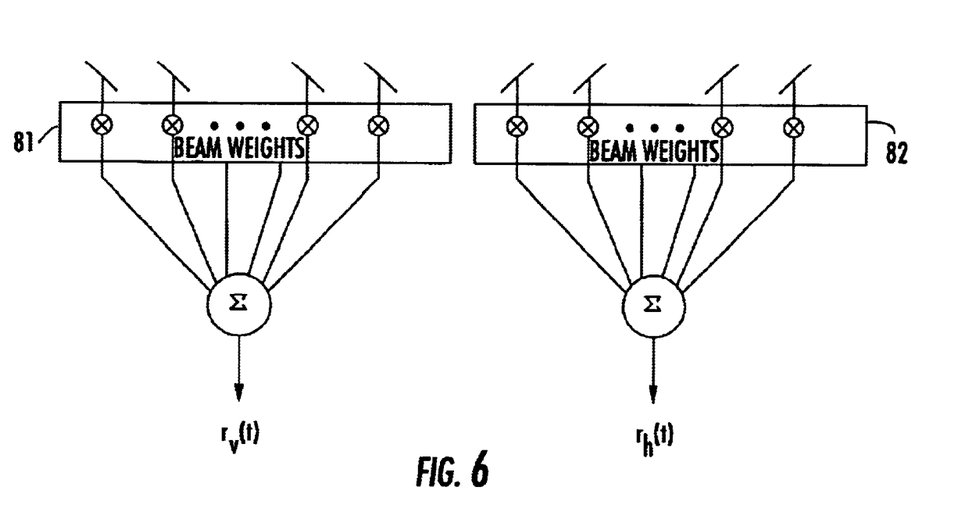
FIG. 6 diagrammatically illustrates the use of plural sets of antennas each having a pair of cross-polarized elements to provide signal inputs to the signal separator architecture of FIG. 4.

Although the architecture of FIG. 4 shows only two antenna elements 51 and 52, it is also possible to employ plural sets of antennas each having a pair of cross-polarized elements (horizontal and vertical), as diagrammatically illustrated at 81 and 82 in FIG. 6. The inputs from these sets of cross-polarized antenna pairs can be weighted and combined upstream of the signal separator 42, in order to optimize the two signals applied to its input ports 61 and 62.

Figure 7:
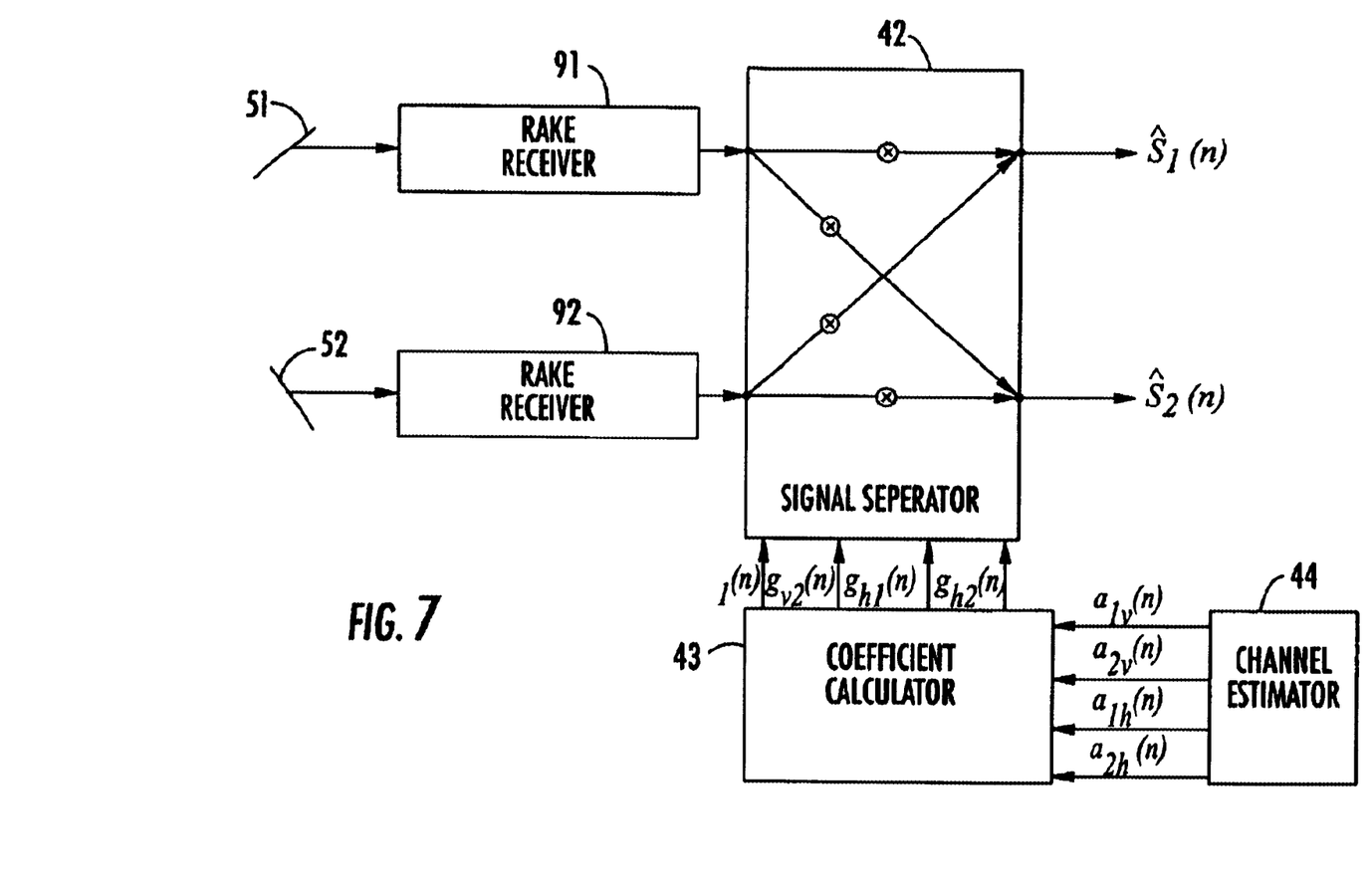
FIG. 7 diagrammatically illustrates a modification of the embodiment of FIG. 4, having Rake receivers installed upstream of the signal separator.

When the channel is subject to frequency selective fading due to multipath, and the signals from different users have low cross-correlation properties, the frequency selective fading may be converted into a substantially flat fading channel by coherently combining the observed multipath. This coherent combining may be readily implemented as diagrammatically illustrated in FIG. 7, by installing a respective Rake receiver 91, 92 for each polarization upstream of the signal separator 42.

As will be appreciated from the foregoing description, the signal separation mechanism of the present invention is able to remedy the above-discussed co-linear interference problem encountered by a wireless communication system base station by exploiting characteristics of the incoming signals other than their direction of arrival. As detailed above, the invention employs diversity gained through the use of antenna array elements having different polarizations. When deployed in an environment having substantially flat fading, the polarization diversity-based separation scheme of the invention provides an extremely simple technique for separating co-linear signals. Like existing multipath processing schemes, the invention can be used in conjunction with multiple access waveforms (e.g., time-division or code-division), and can complement other signal separation methods such as array-based 'smart' beam-forming schemes.

Non-limiting examples of such smart, array-based, beam selective systems include those described in co-pending U.S. patent application Ser. No. 09/091,287, filed May, 18, 1998, entitled: "Selective Modification of Antenna Directivity Pattern to Adaptively Cancel Co-channel Interference in TDMA Communication System," by K. Halford et al and U.S. patent application Ser. No. 09/081,460, filed May, 19, 1998, entitled: "Bootstrapped, Piecewise-Asymptotic Directivity Pattern Control Mechanism Setting Weighting Coefficients of Phased Array Antenna," by P. Martin et al, each of which is assigned to the assignee of the present application and the disclosures of which are incorporated herein.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. For use with a wireless communication system, wherein a transmission from a desired user, and from one or more potential interferers may impinge upon a base station receiver along generally common directions passing through a common lobe of a radiation pattern of an antenna of said base station, a method of separating signals received from said desired user from an interferer comprising the steps of:

(a) receiving signals from said desired user and said interferer via each of at least two antenna elements having respectively different polarizations; and (b) performing linear signal processing of signals received by said at least two diverse polarization antenna elements using information, including training sequence signals, contained in signals received from said desired user and from said interferer, and comprising estimating signals received from said desired user and from said interferer by weighting and selectively combining said received signals using polarization coefficients derived from estimated channel fading coefficients.

2. A method according to claim 1, wherein step (b) comprises estimating said channel fading coefficients in accordance with said training sequence signals.

3. A method according to claim 1, wherein step (a) comprises receiving signals from said desired user and said interferer by means of each of plural pairs of diversely polarized antenna elements, outputs of which are weighted and summed prior to being processed in step (b).

4. A method according to claim 1, wherein step (a) comprises receiving signals from said desired user and said interferer by means of each of respective Rake receivers coupled to diversely polarized antenna elements.

5. For use with a wireless communication system wherein a transmission from a desired user and that from a potential interferer arrive at a receiver along a generally common direction passing through a common lobe of a radiation pattern of an antenna system to which said receiver is coupled, an arrangement for separating signals received from said desired user from those of said interferer comprising:

a plurality of generally co-located antenna elements having respectively different polarizations; and a signal separator coupled to said generally co-located antenna elements and being operative to perform linear signal processing of signals received by said antenna elements using polarization coefficients derived from estimated channel fading coefficients associated with multipaths for said desired user and said potential interferer, so as to identify each of signals received from said desired user and from said interferer.

6. A receiver for use with a wireless communication system wherein a transmission from a desired user and from an interferer may impinge upon a base station receiver from a general direction passing through a common lobe of a radiation pattern of an antenna of said base station, and being operative to separate signals received from said desired user from those of said interferer, comprising:

a plurality of generally co-located antenna elements having respectively different polarizations; and a linear signal processor coupled to said antenna elements and being operative to perform linear signal processing of signals received by said antenna elements using polarization coefficients derived from estimated channel fading coefficients associated with multipaths for said desired user and said interferer, so as to identify each of signals received from said desired user and from said interferer.

7. A receiver according to claim 6, wherein said channel fading coefficients are based upon information contained in signals received from said desired user and said interferer.

8. A receiver according to claim 6, wherein said information contained in signals received from said desired user and said interferer includes training sequence signals.

9. A receiver according to claim 8, wherein said linear signal processor is operative to estimate signals received from said desired user and from said interferer by weighting and selectively combining said received signals using polarization coefficients derived from estimated channel fading coefficients.

10. A receiver according to claim 6, wherein said plurality of generally co-located antenna elements comprises plural pairs of diversely polarized antenna elements, outputs of which are weighted and summed prior to being processed by said linear signal processor.

11. A receiver according to claim 6, wherein said linear signal processor comprises an RF downconverter that is operative to output baseband, discrete-time samples of signal waveforms received at said plurality of diverse polarization antenna elements to a signal separator, said signal separator being operative to weight and selectively combine said received signals using polarization coefficients derived from estimated channel fading coefficients supplied by a coefficient emulator, so as to identify each of signals received from said desired user and from said interferer.

12. A receiver according to claim 11, further including a polarization coefficient generator which is operative to generate said polarization coefficients in accordance with said channel fading coefficients.

13. A receiver according to claim 12, further including a channel estimator which is operative to generate said channel fading coefficients in accordance with training sequence signals received from said desired user and said interferer.

14. A receiver according to claim 12, further including respective Rake receivers coupled between said plurality of generally co-located antenna elements and said linear signal processor.

* * * * *

UNITED STATES PATENT AND TRADEMARK OFFICE
CERTIFICATE OF CORRECTION

PATENT NO.    : 6,754,511 B1
DATED         : June 22, 2004
INVENTOR(S)   : Halford et al.

It is certified that error appears in the above-identified patent and that said Letters Patent is hereby corrected as shown below:

Column 2,
Line 55, delete "a invention" insert -- invention --

Column 3,
Line 8, delete "vertically polarized," insert -- 'vertically polarized' --
Line 40, insert -- to -- before "minimize"

Column 5,
Line 46, delete "which signal which signal" insert -- which signal --
Line 47, delete "user," insert -- user$_1$ --
Line 49, delete "the$_1$" insert -- the --

Column 10,
Line 2, insert -- the -- before "signals"

Signed and Sealed this

Fourteenth Day of December, 2004

JON W. DUDAS
*Director of the United States Patent and Trademark Office*